US006940549B2

United States Patent
Dillen et al.

(10) Patent No.: US 6,940,549 B2
(45) Date of Patent: Sep. 6, 2005

(54) IMAGE SENSOR SIGNAL DEFECT CORRECTION

(75) Inventors: Bartholomeus Goverdina Maria Henricus Dillen, Eindhoven (NL); Arjen Gerben Van Der Sijde, Eindhoven (NL); Ralph Langen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 749 days.

(21) Appl. No.: 09/886,063

(22) Filed: Jun. 21, 2001

(65) Prior Publication Data

US 2002/0012476 A1 Jan. 31, 2002

(30) Foreign Application Priority Data

Jun. 23, 2000 (EP) .......................................... 00202200

(51) Int. Cl.[7] .............................. H04N 1/38; H04N 9/64; H01L 27/00
(52) U.S. Cl. ..................... 348/246; 250/208.1; 358/463
(58) Field of Search ................................. 348/246, 245, 348/247, 241, 242, 251, 252; 250/208.1; 358/3.26, 530, 463, 513, 514

(56) References Cited

U.S. PATENT DOCUMENTS

| 4,701,784 A | * | 10/1987 | Matsuoka et al. | .......... 348/247 |
| 5,696,554 A | * | 12/1997 | Hwang | ........................ 348/246 |
| 5,805,216 A | * | 9/1998 | Tabei et al. | ................. 348/246 |
| 6,104,839 A | * | 8/2000 | Cok et al. | .................... 382/254 |
| 6,593,961 B1 | * | 7/2003 | Perino | ......................... 348/247 |
| 6,704,458 B2 | * | 3/2004 | Ford | ........................... 382/275 |
| 6,707,493 B1 | * | 3/2004 | Lee et al. | .................... 348/246 |
| 6,724,945 B1 | * | 4/2004 | Yen et al. | ................... 348/246 |
| 6,806,902 B1 | * | 10/2004 | Donovan | .................... 348/246 |
| 2001/0036305 A1 | * | 11/2001 | Jun | ............................. 382/149 |
| 2003/0063203 A1 | * | 4/2003 | Ohno | ......................... 348/247 |

FOREIGN PATENT DOCUMENTS

| EP | 0519719 A2 | 12/1992 | |
| EP | 0685964 A1 | 12/1995 | |
| EP | 778543 A2 | * 6/1997 | ............. G06T/5/20 |
| GB | 2364461 A | * 1/2002 | .......... H04N/5/217 |
| JP | 61260773 A | 11/1986 | |
| JP | 10150570 A | * 6/1998 | .......... H04N/1/409 |
| JP | 2001028711 A | * 1/2001 | .......... H04N/5/335 |
| JP | 2001307079 A | * 11/2001 | ............. G06T/1/00 |

* cited by examiner

Primary Examiner—Wendy R. Garber
Assistant Examiner—John Villecco
(74) Attorney, Agent, or Firm—Aaron Waxler

(57) ABSTRACT

In a method of correcting defects in image data comprising an array of pixels, the intensity of pixels of the image data in each side of the defect is sampled (5), differences between the samples intensities are calculated (6) to generate intensity difference signals (D1–D4) indicative of intensity differences across and on respective sides of the defect, and the defect is corrected (7–11) in dependence on the intensity difference signals (D1–D4). Preferably, depending on the intensity difference signals (D1–D4) either an average correction technique or no defect pixel correction is used, the average correction technique being used if the intensity difference signals do not exceed a predetermined level value (L1,L2).

13 Claims, 2 Drawing Sheets

IMAGE SENSOR SIGNAL DEFECT CORRECTION

Figure 1:
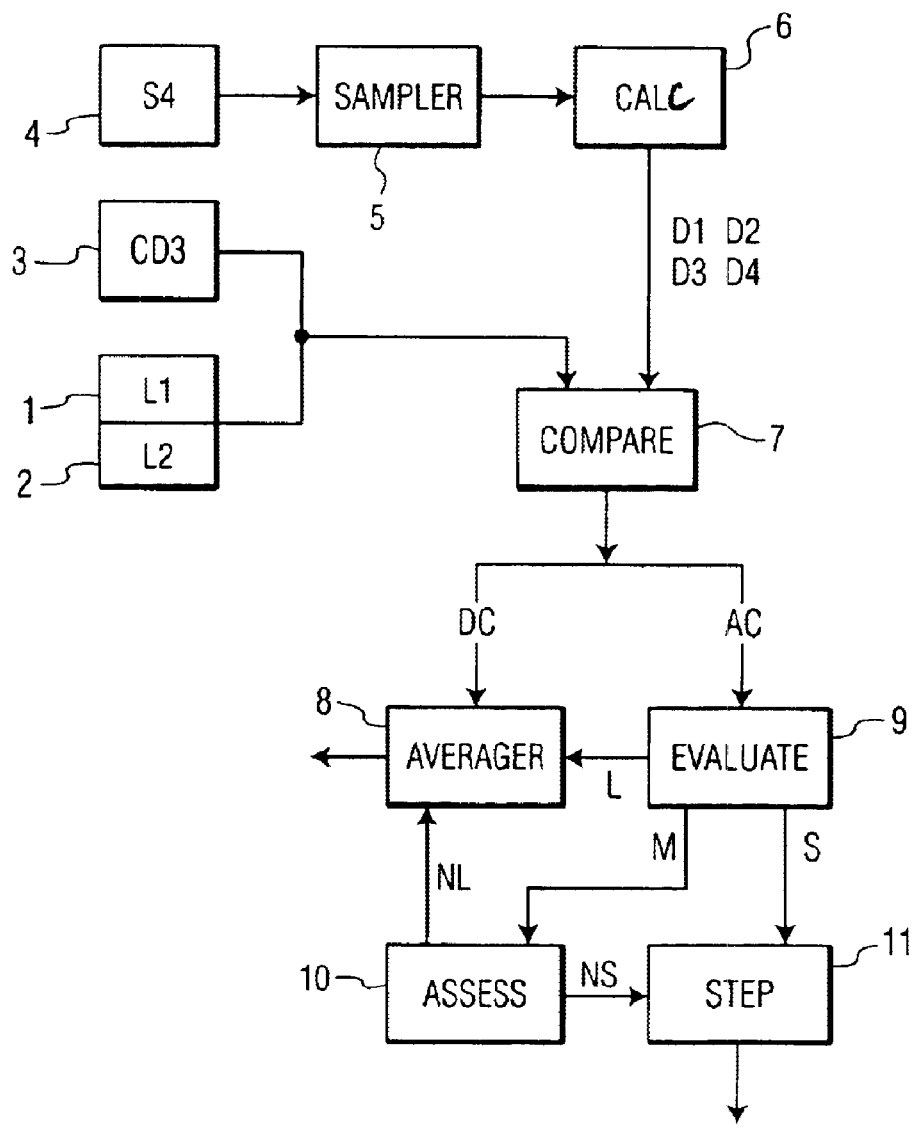

The invention relates to the correction of defects in image sensors, and is applicable to digital signal processors, digital still cameras and to digital video cameras. It has particular relevance to image sensors for consumer electronics and for medical systems, and is suitable for incorporation in a digital signal processor.

Defects in images can take the form of single pixels, clusters or columns which have a small sensitivity difference compared to the rest of the image. A defect pixel may have a higher or a lower output signal than its neighboring pixels at the same illustration. This can be caused by defects in the sensor itself or by defects on the cover class of the image sensor that arise because the pixels around the edges of a sensor block will generally have lower sensitivity. In case of a big sensor, this sensor has to be built up out of different blocks. The signals from these blocks are stitched together. At the borders of these blocks the sensors have a slightly different sensitivity than the neighboring pixels. This results in a so-called stitch line, which often appears as a visible line dividing the image. For example, in a known image sensor, a stitch line may appear as a double column with a gain difference above 1% and frequently up to 3%.

EP 0 519 719 describes a method of reducing edge defects in images generated using arrays of pick-up elements. An image splitter is employed to separate the images corresponding to adjacent elements in the array so as to reduce the edge effects.

JP-A 61-260773 discloses a defect pixel correction in dependence on a plurality of differences across a defect.

EP-A 0 685 964 discloses a CCD-defect compensating method for a camcorder, including the steps of: sequentially delaying input pixel data; operating the values of pixels preceding and behind two stages from an nth pixel, and comparing the operated value with a reference level value to detect the presence or absence of a defect; averaging the pixel data two stages preceding and behind the nth pixel having the defect, to thereby obtain the nth pixel data; deciding the position of the defect to thereby generate a defect compensating control signal; and selectively compensating only for the pixel data averaged in the averaging step or the pixel data having the defect and delayed in the pixel delaying step, and outputting the compensated data with the original (externally input) pixel data.

Defect correction can be accomplished by a correction that uses a (suitably weighted) average value of neighboring pixels that are not defect, the so-called average correction technique that is known to skilled persons in this technical field. However, the performance of the average correction technique is not good enough to completely eliminate the wide range of possible defects, including stitch lines and clusters, over a wide range of circumstances.

It is, inter alia, an object of the invention to improve defect correction in image sensors. To this end, the invention provides a defect correction as defined in the independent claims. Advantageous embodiments are defined in the dependent claims.

According to one embodiment of the invention, if the severity of the defect is large then average correction is used. If the severity is small, then the defect pixel value is not corrected. For in-between values, the level of good nearby pixels is assessed and the defect pixel value is not corrected for relatively small level differences, while the average correction is used for relatively large differences.

These and other aspects of the invention will be apparent from and elucidated with reference to the embodiments described hereinafter.

Figure 2:
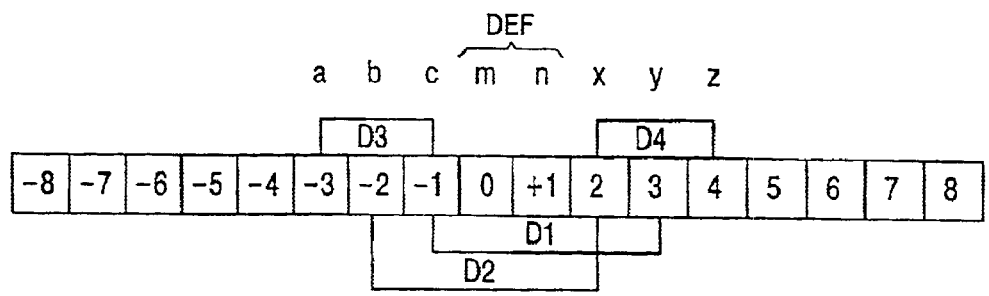
Figure 3:
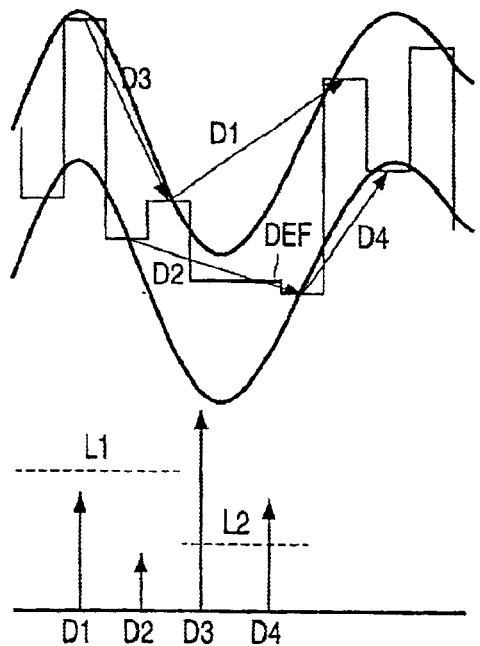
Figure 4:
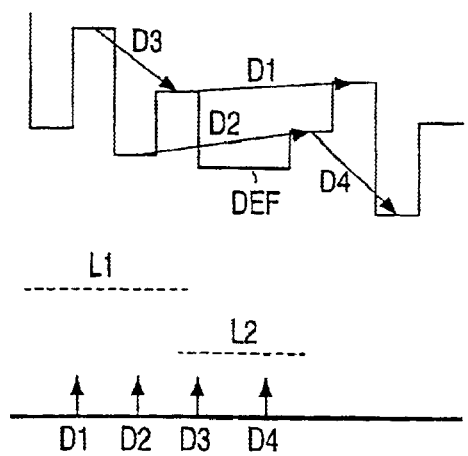

In the drawings:

FIG. 1 is a block flow diagram schematically illustrating one embodiment of a method according to the present invention;

FIG. 2 schematically illustrates one stage of the method of FIG. 1;

FIG. 3 schematically illustrates one example applied to another stage of the method of FIG. 1; and FIG. 4 schematically illustrates another example applied to the stage of FIG. 3.

In FIG. 1 various stages of one embodiment of the method of the invention are show. Level signal 1 L1, level signal 2 L2 and calibration information 3 CD3 are determined in dependence upon the application concerned and the customer requirements. Digital Image data from a sensor 4 S4 is supplied and pixel sampling is effected at sampler 5. At least two and preferably three pixels are sampled on each side of a defect. Differences between the intensities of the preferably pixels are then calculated at difference calculator 6. Four difference values D1, D2, D3, D4 are calculated; two different values D1, D2 generated by differences in intensity across the defect and a difference value D3, D4 relating to each side of the defect.

The difference signals D1, D2, and D3, D4 are then compared at comparator 7 to the level signals L1 and L2, respectively. If any one of the difference signals is higher than its respective level signal then the image scene is categorized as "high frequency" (AC), but if all difference signals are lower than the two level signals then the image scene is categorized "low frequency" (DC). This is termed the "DC Test".

When all the difference signals are lower than the level signals L1 and L2, and the "DC test" thus results in low frequency (DC), this is considered an even image, and the average correction technique is employed by averager 8 on the image.

In a first embodiment, no correction is applied when the image scene around the defect is categorized as "high frequency". The following holds for a more advanced embodiment.

When the DC test results in high frequency (AC) then the size (severity) of the defect is assessed at evaluator 9. If the defect is large (L), for example, when there is no output signal (=dead pixel), then the average correction technique (8) is again followed. If the size of the defect is medium (M), the intensity level of close or adjacent (nearby) good pixels is assessed at assessor 10 and, depending upon their value either the average correction technique (8) is used when the nearby levels are large (NL), or the defect is not corrected (11) when the nearby levels are small (NS). Finally, if the size of the defect is small (S), no correction is applied to the defect pixel value in step 11.

While a block diagram is shown, each block following the image sensor S4 may be seen as a method step carried out by an image processor in a software implementation.

FIG. 2 schematically illustrates the calculated difference values. Pixels are labeled as a, b, c on one side of a defect cluster DEF and x, y, z on the opposite side. In this example the cluster DEF comprises two pixels m, n. The following differences are calculated:

D1: c-y

D2: b-x

D3: a-c

D4: x-z

Thus D1 and D2 represent differences between pixels on opposite sides of the defect cluster DEF whereas D3 and D4 represent the differences between pixels which lie on respectively the same sides of the defect DEF.

FIG. 3 shows one particular example applied to the method of the invention. The intensities of the pixels a, b, c and x, y, z are represented by the bar graph and the differences D1 to D4 are illustrated by the respective arrows which are reproduced in the lower graph which also shows the values of level 1 and level 2 for comparison. In this example D3 and D4 are above level 2 and thus this image is treated for correction as a "high frequency" (AC) image. The size of the defect is then assessed. If the size of the defect is large then the average correction technique is applied. If the defect is small then no correction is done. If the defect is of medium size then the intensity level of good adjacent pixels is assessed and either the average correction is used or the defect pixel value is not corrected as explained above.

In FIG. 4 a more even image is used and the frequency is lower. All of the difference signals D1, D2, D3 and D4 are below level 2. This will be treated as low frequency (DC), i.e. since it is a relatively even image, and correction will be by way of the average correction technique.

This correction method gives a good correction capability across a wide range of defects and defect sizes and can substantially reduce or eliminate the small defect lines hitherto seen.

Typical results of the method of the invention are achieved on images of a checkered shirt. This is a high frequency (AC) image and a stitch line tends to be very obvious in such scenes: a 3% small defect column would be typical. When the average correction technique is used, the small defect lines are still very evident. When the method of the invention is used and level correction (small) is applied with for superior results: the small defect line is barely visible.

In a second example, the method of the invention is applied to a scene with cluster defects. A raster of 24% clusters in the air and in the grill of a classic car is present in the original image. It appeared that the cluster defects in the image, particularly in the grill, are substantially reduced by means of the level correction method according to the invention, thus illustrating that the method of the invention can correct rather large clusters which previous technologies could not.

Generally, the levels at which defects are categorized as large, medium or small is determined during calibration of the device in production.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A method of correcting defects in image data comprising an array of pixels, the method comprising:
    sampling (5) the intensity of pixels of the image data in each side of a defect;
    calculating (6) differences between the sampled intensities to generate one or more first intensity difference signals (D1, D2) indicative of intensity differences across the defect;
    calculating (6) difference between the sampled intensities to generate at least two second intensity difference signals (D3, D4) indicative of an intensity difference on each respective side of the detect, and
    correcting (7–11) the defect in dependence on the first and second intensity difference signals (D1–D4), a defect being replaced by an average of surrounding pixels if said first and second intensity difference signals do not exceed a predetermined level value (L1,L2).

2. A method according to claim 1, wherein the sampling step (5) comprises sampling the intensity of three pixels on each side of the defect, and wherein the calculating step (6) comprises two intensity difference signals (D1,D2) across a defect, and one intensity difference signal (D3, D4) at each side of the detect.

3. A method as claimed in claim 1, further comprising the steps of:
    comparing (7) the intensity difference signals (D1–D4) with the predetermined level value (L1, L2) to generate (7) a first control signal (AC) if any one of the intensity difference signals (D1–D4) is above the predetermined level value (L1, L2), and a second control signal (DC) if all of the intensity difference signals are below the predetermined level value (L1, L2).

4. A method according to claim 3, wherein the predetermined level value (L1, L2) is determined by calibration to an apparatus for which the method is used.

5. A method according to claim 3, wherein the predetermined level signal (L1, L2) comprises a first level signal (L1) and a second level signal (L2).

6. A method according to claim 3, further comprising the additional step of assessing (9) a size of the defect if the first control signal (AC) is generated.

7. A method according to claim 6, further comprising employing average correction techniques (8) if the first control signal (AC) is generated and the size of the defect is large (L).

8. A method according to claim 6, further comprising employing no defect pixel value correction if the size of the defect is small (S).

9. A method according to claim 6, further comprising the step of assessing (10) the level of good nearby pixels in the event that the defect size is medium (M).

10. A method according to claim 9, wherein no defect pixel value correction (11) is employed if the level of the good nearby pixels is relatively small (NS).

11. A method according to claim 9, wherein average correction techniques (8) are employed if the level of the good nearby pixels is relatively large (NL).

12. Apparatus for correcting defects in image data comprising an array of pixels, the apparatus comprising:
    means (5) for sampling the intensity of pixels of the image data in each side of the defect;
    means (6) for calculating differences between the sampled intensities to generate one or more first intensity difference signals (D1, D2) indicative of intensity differences across the defect;
    means (6) for calculating differences between the sampled intensities to generate at least two second intensity difference signals (D3, D4) indicative of an intensity difference on each respective side of the defect; and
    means (7–11) for correcting the defect in dependence on the intensity difference signals (D1–D4), a defect being replaced by an average of surrounding pixels if said first and second difference signals do not exceed a predetermined reference value (L1,L2).

13. A camera, comprising:
    an image sensor (S4) for furnishing image data; and
    an apparatus for correcting defects in the image data as claimed in claim 12.

* * * * *